Figure 1:
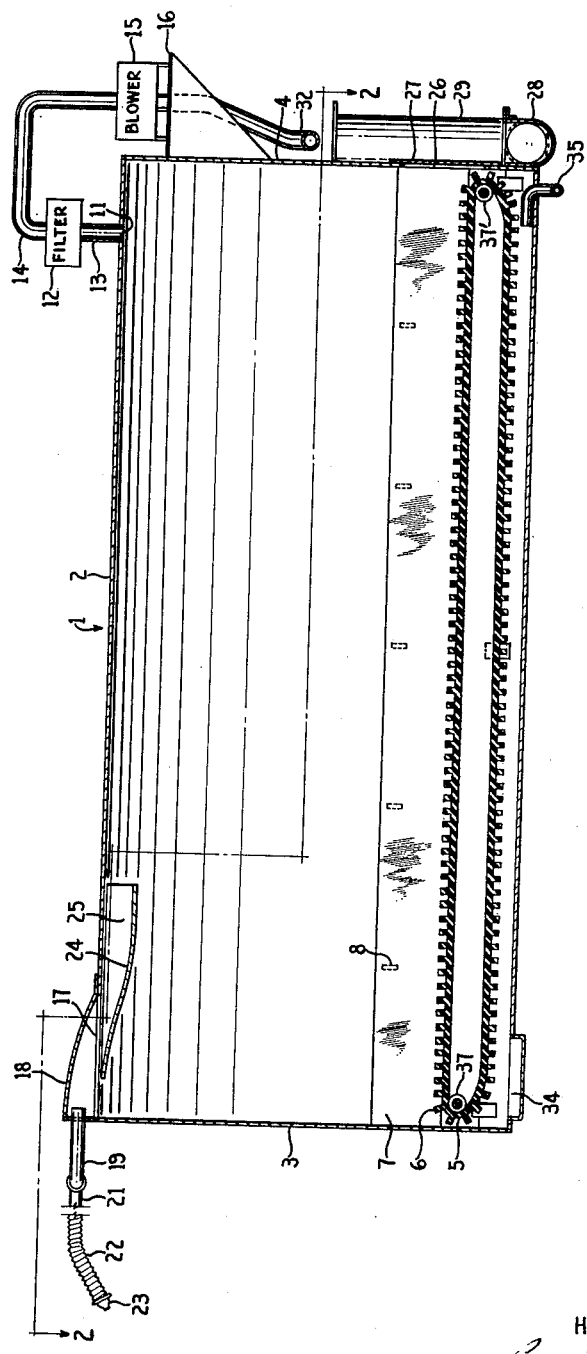

Nov. 21, 1961   H. D. BURDETT   3,009,574
HARVESTING APPARATUS
Filed Aug. 13, 1957   9 Sheets-Sheet 1

INVENTOR.
HAROLD D. BURDETT
BY
Attys

INVENTOR.
HAROLD D. BURDETT

INVENTOR.
HAROLD D. BURDETT

Nov. 21, 1961 H. D. BURDETT 3,009,574
HARVESTING APPARATUS
Filed Aug. 13, 1957 9 Sheets-Sheet 4

INVENTOR.
HAROLD D. BURDETT

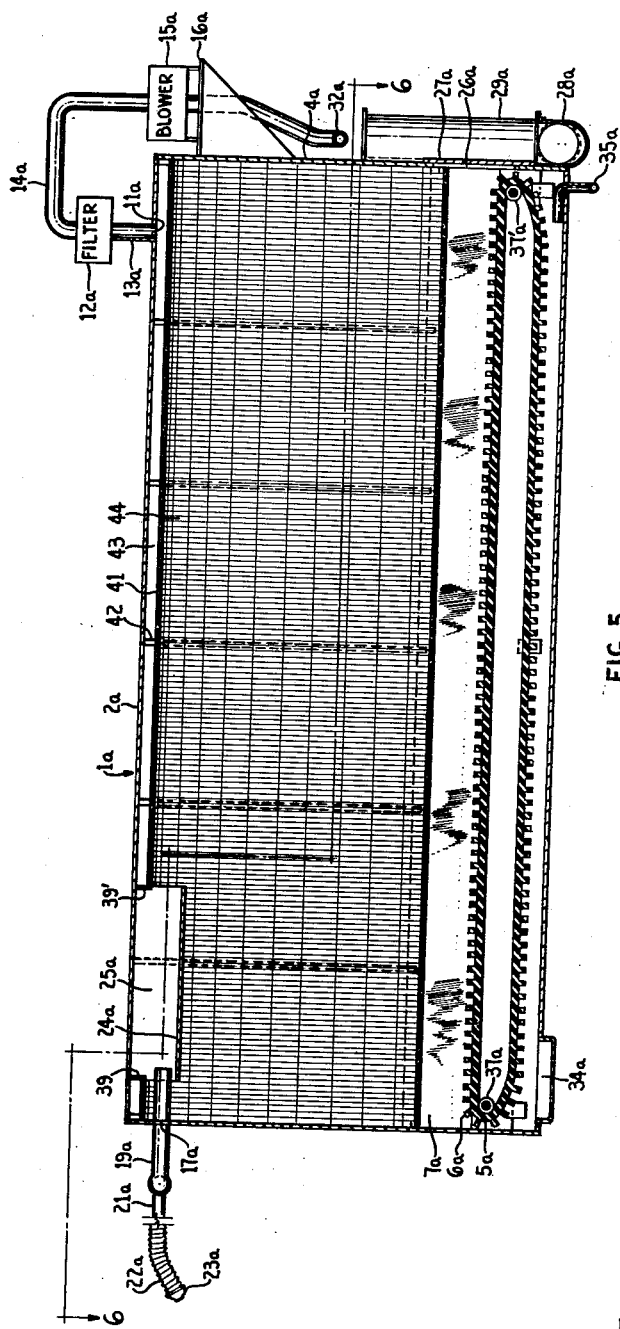

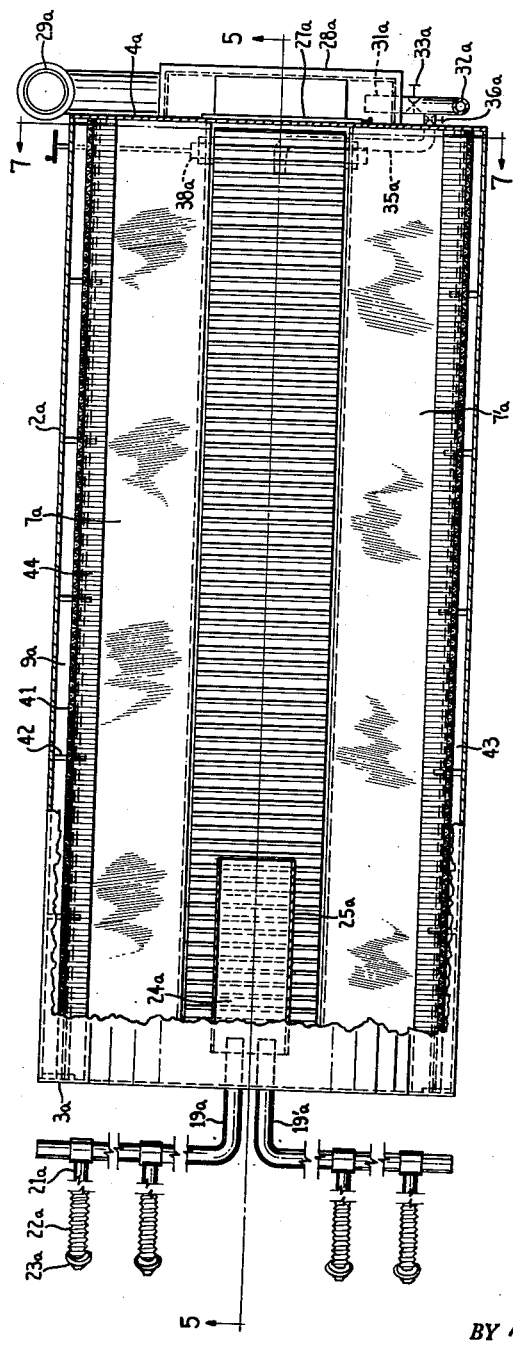

Nov. 21, 1961 H. D. BURDETT 3,009,574
HARVESTING APPARATUS
Filed Aug. 13, 1957 9 Sheets-Sheet 7

INVENTOR.
HAROLD D. BURDETT
BY
attys

Nov. 21, 1961     H. D. BURDETT     3,009,574
HARVESTING APPARATUS

Filed Aug. 13, 1957                               9 Sheets-Sheet 8

INVENTOR.
HAROLD D. BURDETT

Nov. 21, 1961  H. D. BURDETT  3,009,574
HARVESTING APPARATUS

Filed Aug. 13, 1957  9 Sheets—Sheet 9

INVENTOR.
HAROLD D. BURDETT

United States Patent Office 3,009,574
Patented Nov. 21, 1961

3,009,574
HARVESTING APPARATUS
Harold D. Burdett, Phoenix, Ariz., assignor to The Hub Manufacturing Corporation, a corporation of Arizona
Filed Aug. 13, 1957, Ser. No. 677,906
22 Claims. (Cl. 209—135)

The present invention relates to the pneumatic conveying and separating of materials and is more particularly concerned with cotton harvesting and precleaning.

This application is a continuation-in-part of my prior application, Serial No. 531,452, filed August 30, 1955, now abandoned and is related to my copending application, Serial No. 677,917, filed concurrently herewith, now Patent No. 2,957,534.

A problem associated with pneumatic cotton picking is that of the trash, such as pieces or bits of leaves, that are entrained with the cotton and deposited therewith in the receiver of the picker. The presence of substantial amounts of trash with the harvested cotton degrades the value of the cotton. Prior attempts to remove such trash from the cotton have not been completely satisfactory.

The present invention utilizes an air flow which is produced in elongated pneumatic receiving vessels to separate such trash from the cotton, upon the entry of the cotton and trash into the receiver, and collects the trash separately from the cotton. In vessels of this type, a substantial portion of the air within the vessel diverges from the inlets and tends to follow either a longitudinal path adjacent the vessel walls, or a spiral path adjacent the vessel walls. In diverging from the inlet, the air carries trash, which is of lesser mass, therewith to adjacent the vessel walls, after which the forces of gravity and friction, as well as deceleration of the air in the vessel, all tend to disentrain the trash, allowing it to slide downwardly along the vessel walls for collection separate from the cotton.

In general, the preferred form of the present invention comprises a closed, cylindrical tank or vessel which is mounted on a vehicle and which is exhausted through an outlet and a suitable air filter by a motor-driven blower mounted on the tank. A material-air inlet aperture is provided in an upper region of the tank at its end remote from the air outlet and is so designed that material introduced with the air through said inlet is propelled longitudinally of the cylindrical tank.

In the lower region of the tank, an endless-belt conveyor, having material-engaging transverse ribs thereon, extends lengthwise of the tank for discharging material collected in the tank through a discharge opening in an end wall of the tank. The belt conveyor is provided with a hand-operated, reversible-ratchet drive which extends through the tank wall for external operation when it is desired to actuate the belt to distribute the load within the tank or to discharge collected material therefrom.

A pair of slope sheets extend upwardly and outwardly from the lateral edges of the belt conveyor at an angle to the horizontal at least equal to the angle of repose of the material to be conveyed, and are secured to the tank wall with their upper, outer edges in spaced relation therewith by a plurality of spacing blocks to provide a passageway or slot between the upper, outer edges of the slope sheets and the tank wall for passage of trash or extraneous matter therethrough as it slides downwardly along the tank wall.

Externally adjacent and below the discharge opening, an ejector is provided for receiving material from the belt conveyor and delivering it through a discharge pipe to a receiver separate from the picker. The jet pipe of the ejector receives compressed air discharged by the blower through a suitable conduit, which conduit also communicates by means of suitable valving with an interior blast pipe adjacent the bottom inner wall surface for the purpose of sweeping the trash thereon to a trash cleanout port in the lower segment of the wall adjacent the opposite end wall of the tank.

Figure 2:
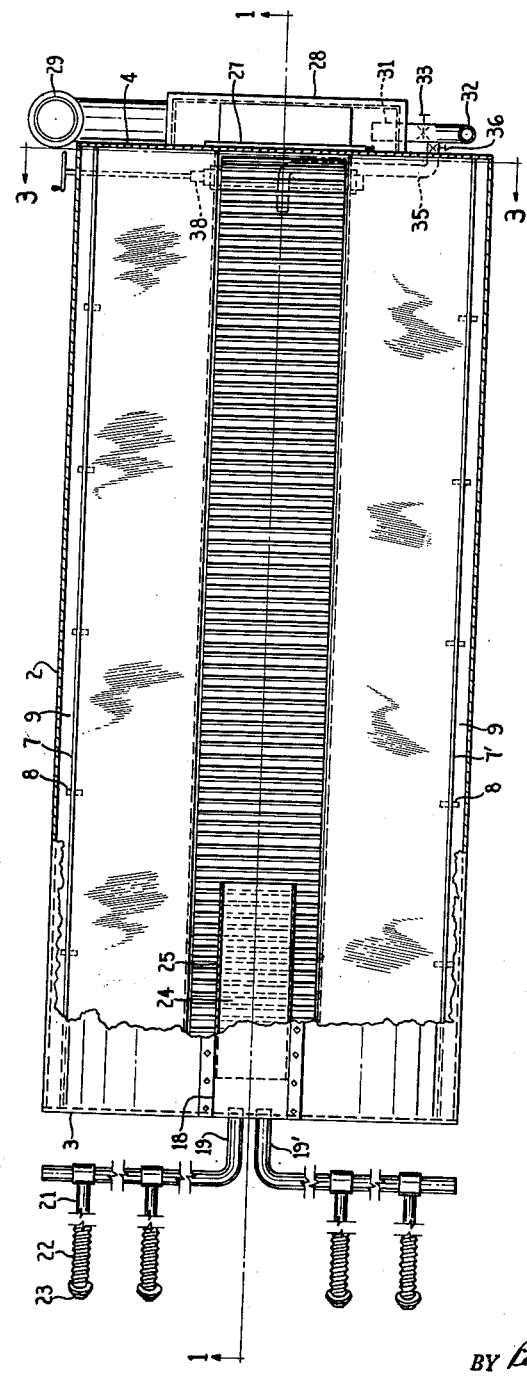
Figure 3:
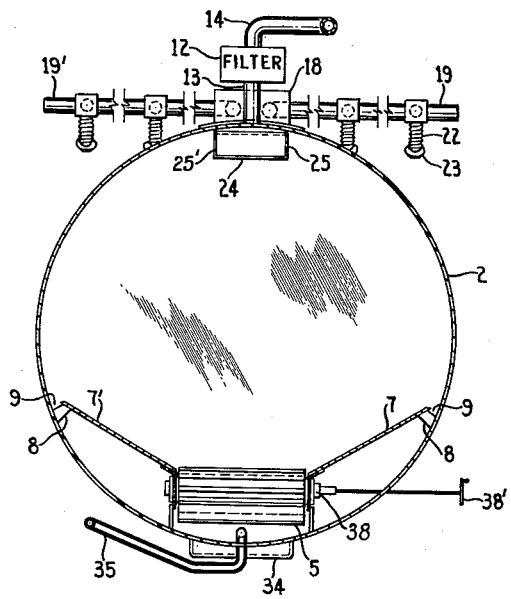
Figure 7:
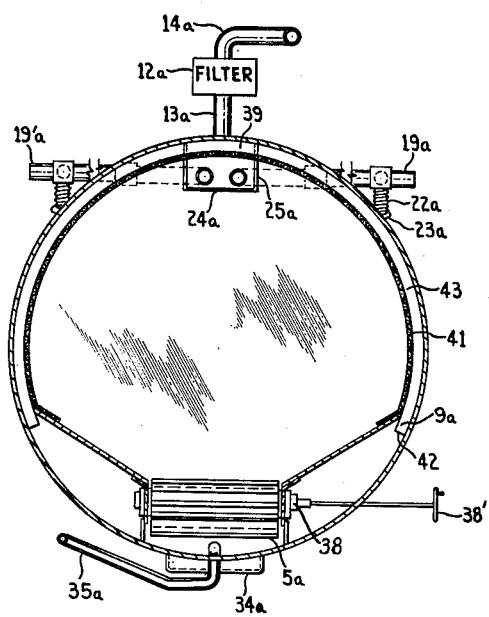
Figure 10:
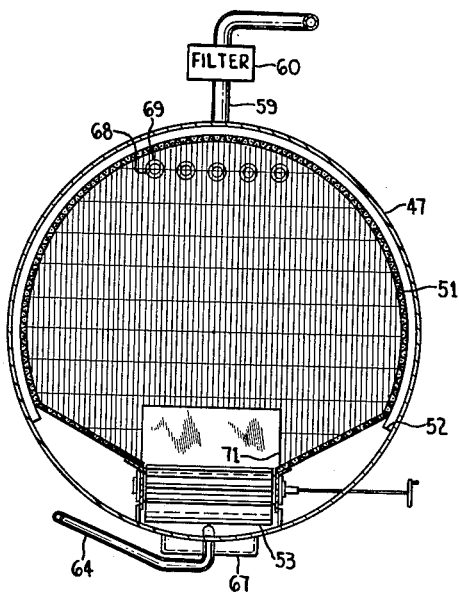
Figure 4:
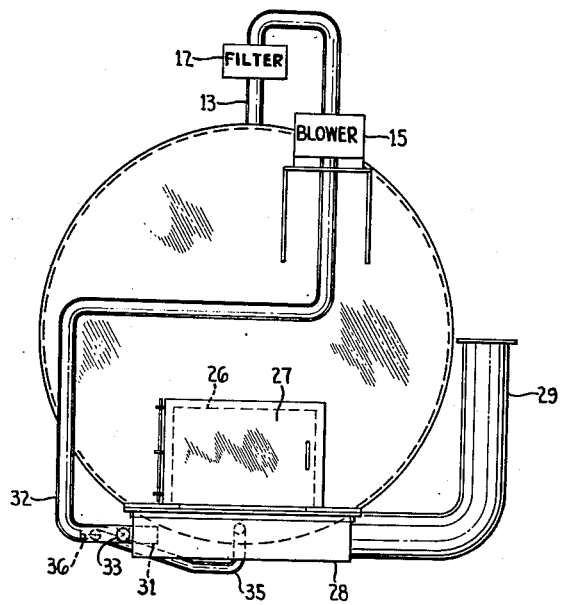
Figure 8:
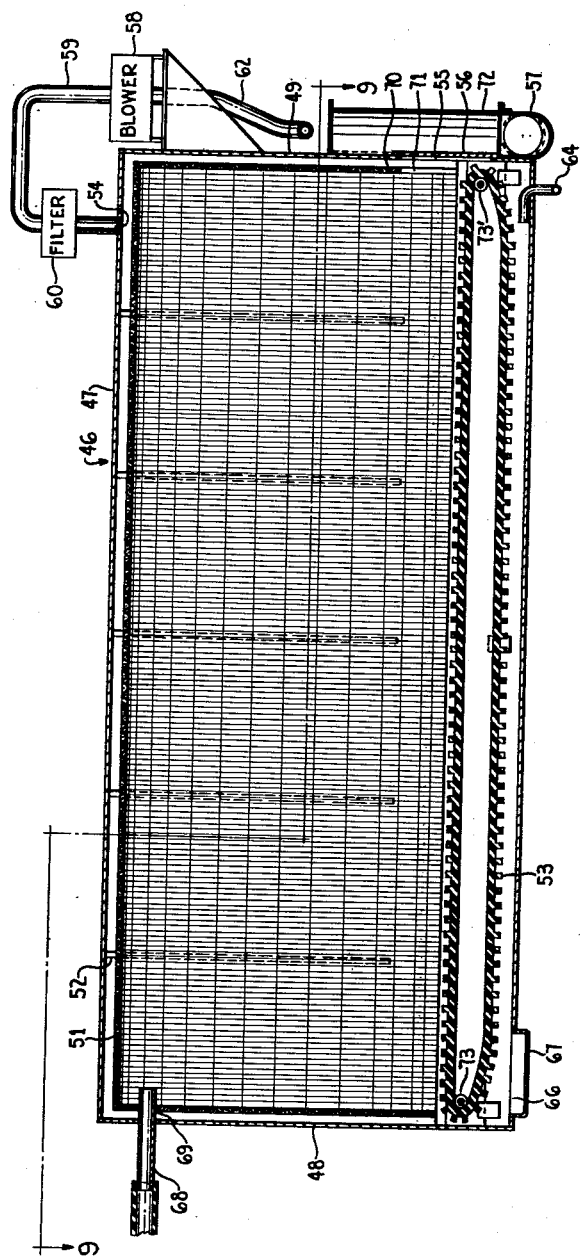
Figure 9:
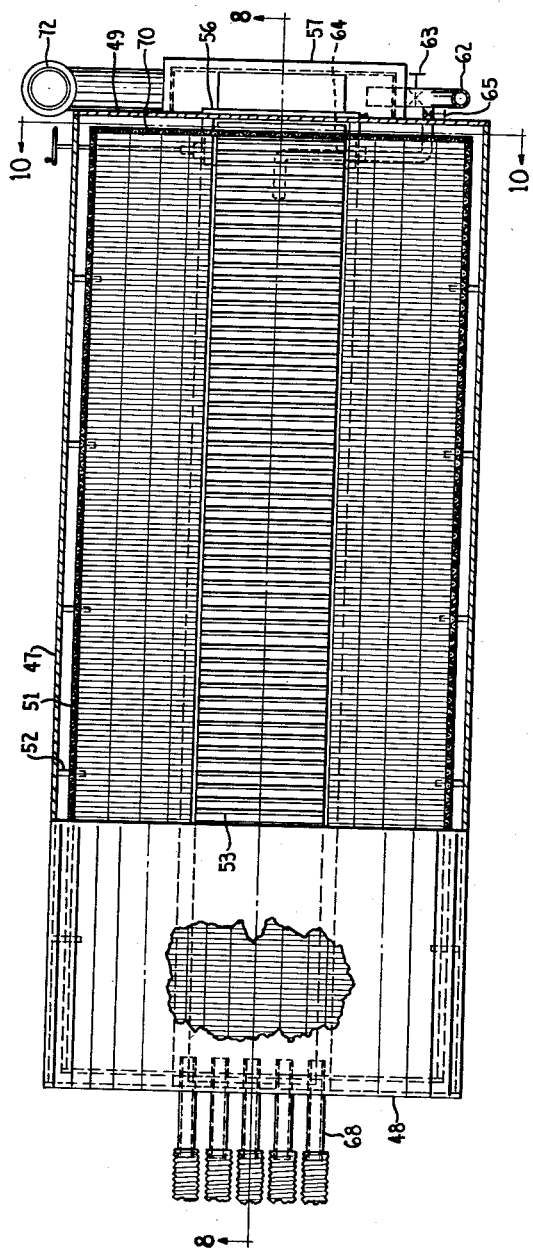
Figure 11:
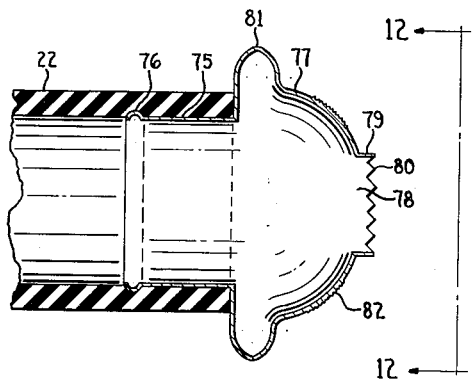
Figure 12:
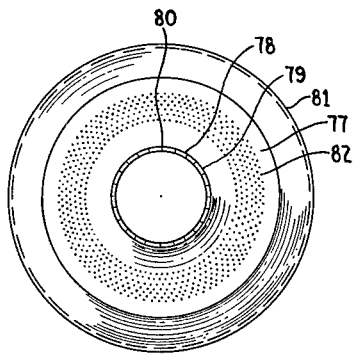
Figure 13:
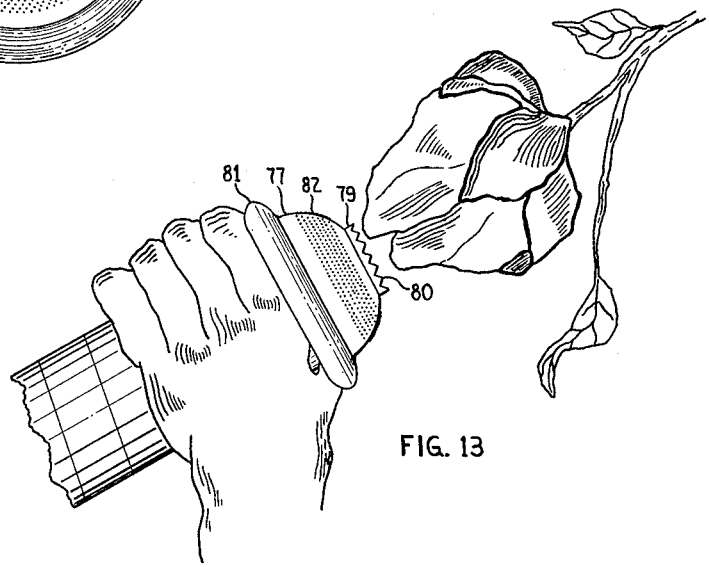

A better understanding of the invention may be derived from the following drawings and description in which:

FIG. 1 is a sectional side view of a cotton picker embodying the invention;
FIG. 2 is a sectional plan view taken along the lines 2—2 of FIG. 1;
FIG. 3 is a cross-sectional view taken along the lines 3—3 of FIG. 2;
FIG. 4 is an end view of the apparatus of FIG. 1 showing the arrangement of the unloading system;
FIG. 5 is a sectional side view of a cotton picker embodying a modified form of the invention;
FIG. 6 is a sectional plan view taken along lines 6—6 of FIG. 5;
FIG. 7 is a cross-sectional view taken along lines 7—7 of FIG. 6;
FIG. 8 is a sectional side view of a further modified form of the invention;
FIG. 9 is a sectional plan view taken along the lines 9—9 of FIG. 8;
FIG. 10 is a cross-sectional view taken along lines 10—10 of FIG. 9;
FIG. 11 is an enlarged sectional view of the picker nozzle;
FIG. 12 is an end view of the nozzle of FIG. 11; and
FIG. 13 is a view of the application of the nozzle to a cotton boll.

As shown in FIGS. 1 through 4, the cotton picker embodying the invention comprises a vehicle-mounted tank 1 having a cylindrical wall 2 and a pair of end walls 3 and 4. In the lower region of the tank, an endless-belt conveyor 5 is arranged longitudinally between the end walls and is provided with transverse ribs 6 on the outer belt surface. Adjacent the respective lateral edges of the belt conveyor, a pair of slope sheets 7 and 7' extend upwardly and outwardly towards lateral sections of the cylindrical wall, and are secured thereto by a plurality of spacing blocks 8 in a spaced relationship with the cylindrical wall to provide longitudinal slots 9 between the upper, outer edges of the slope sheets and the tank wall. The width of the slots, or the spacing of the slope sheet edges from the cylindrical wall may be, for instance, 5⁄8", 1", or greater. However, excessive slot widths may permit entrance of cotton bolls therethrough while insufficient slot widths may impede the desired air flow and passage of trash therethrough.

In the upper region of the tank and near the rear end wall 4, an air outlet aperture 11 is provided in the cylindrical wall and communicates with an air filter 12 by means of a conduit 13. An exhaust conduit 14 extends from the air filter 12 to a suitable motor-driven blower 15 mounted on a platform 16 on the end wall 4.

In the upper region of the tank near the front end wall 3, an inlet aperture 17 is provided in the cylindrical wall 2 and communicates by means of an arcuate inlet member 18 with a pair of inlet pipes 19 and 19'. At their outer ends, the inlet pipes 19 and 19' terminate in branch pipes 21 to which a plurality of individual flexible hoses 22, preferably formed of rubber, are connected which, in turn, carry individual picking nozzles 23 at their outer ends.

Within the tank and below the inlet aperture 17, a deflector plate 24 is arranged in a position such that its upper plane intersects a projected arc of the curvature of the inlet member at a low angle of incidence. The deflector plate 24 is supported from the upper segment of the cylindrical wall by means of a pair of side walls 25 and 25' and forms a longitudinal, open-ended channel therewith.

In the rear end wall 4 adjacent and extending below the end of the upper surface of the belt conveyor 5, an unloading aperture 26 is provided which is closeable by means of a hinged door 27. An ejector 28 is provided on the rear end wall 4 immediately adjacent and slightly below the unloading aperture 26, and is provided with a discharge pipe 29. At its end opposite from the discharge pipe, the ejector is provided with a jet pipe 31 which receives compressed air by means of a conduit 32 extending from the discharge of the blower 15 and having a valve 33 therein.

A trash clean-out port 34 is provided in the lower segment of the cylindrical wall 2, adjacent the front end wall 3. Adjacent the rear end wall 4, a branch pipe 35 having a valve 36 therein extends from the conduit 32, at a point between the blower 15 and the valve 33, continues through the lower segment of the cylindrical wall 2, and is turned just inside the cylindrical wall and directed longitudinally therealong, beneath the lower course of the belt conveyor 5, toward the trash clean-out.

The belt conveyor 5 is provided with suitable end pulleys 37 and 37' and with a reversible-ratchet drive 38 and a remote handwheel 38' therefor positioned outside the cylindrical wall 2, whereby the belt conveyor may be actuated manually to distribute the load within the tank or to discharge collected material from the tank through the discharge aperture.

As shown in FIGS. 11, 12 and 13, the nozzle 23 comprises a neck portion 75 adapted to fit inside the bore of the flexible hose 22, with a peripheral ridge 76 at its inner end sufficiently large to distend the flexible hose, thereby securing itself to the hose. From the neck portion, the nozzle extends as a rounded bell 77 having an intake aperture 78 which is coaxial with the neck and defined by a collar 79 having serrations 80. A flared portion 81 of bell 77 limits its penetration into the hose. A roughened area 82 is formed on the bell 77 between the collar 79 and the flared portion 81. The diameter of the neck portion 75 is preferably two-thirds greater than the intake aperture 78, with the diameter of the bell 77 exceeding both of the other two and at least double the aperture 78. Aperture, bell, and neck diameters of 1, 2, and 1¾ inches, respectively, have been found advantageous.

When the nozzle is positioned adjacent an open boll of cotton, the sweep of atmospheric air toward the inlet aperture 78 entrains the cotton. The cotton boll is therefore elongated by the opposing forces of its fastening to the stem and the sweep of the atmospheric air, and travels substantially longitudinally, with respect to its elongation, through the inlet aperture 78. However, immediately upon emerging into the bell from the inlet aperture, the expansion of the air therein causes the boll to be subjected to a sudden deceleration and substantial expansion, thereby resuming a substantially rotund form, presenting a greater area to the air to cause a greater pull against the stem, and being agitated so that particles of trash entrapped therein, such as bits of sand, are at least initially loosened if not entirely dislodged from the boll. Upon emerging from the bell of the nozzle and into the neck portion, the boll continues in a substantially round form, unless its diameter is sufficiently large that it is required to elongate slightly to pass therethrough.

In cases wherein a tight hull is encountered which confines a boll of cotton which is otherwise suitable for harvesting, the serrations 80 and roughened area 82 are used as a rasp on the outside of the hull. This rasping action causes the hull to open under the internal forces exerted by the cotton and to release the lint. As the nozzle is moved toward the boll, the roughened area 82, the serrations 80, and the curvate surface of the bell tend to retain the hulls of the boll in a laterally distended position, and to restrain them from being sucked into the aperture by the sweep of the air. The curvate surface offers a shoulder against which the hull or leaf is supported to resist displacement by the air, which in the case of a hard or stiff hull or leaf is sufficient to prevent its entry into the aperture. In the case of relatively soft or flexible hulls or leaves, however, which might otherwise be bent and therefore swept in a radial direction toward the inlet, entrainment is further prevented by the friction of the roughened area 82 and the serrations 80.

In operation of the apparatus of FIGS. 1 through 4, the motor drives the blower 15 to evacuate air from the tank through the conduit 13, filter 12 and exhaust conduit 14. Evacuation of the tank causes an influx of atmospheric air through the nozzles 23, flexible hoses 22, branch pipes 21, intake pipes 19, inlet member 18 and inlet aperture 17 to the interior of the tank. Cotton which is picked up by the nozzles 23 is introduced into the air stream and travels through the hoses to the intake pipes 19 from which it is projected against the curved wall of the inlet member 18, meeting the curved wall at a very low angle of incidence, and therefore, with a minimum of impingement force. The cotton is gradually deflected by the curved wall downward toward the deflector plate 24. As the cotton is deflected from the curved wall, it is swept onto the upper surface of the deflector plate 24, again at a very low angle of incidence. The upper surface of the deflector plate continues the guidance of the cotton longitudinally, with respect to the tank, towards the rear end wall 4. As the cotton is discharged from the inner end of the intake pipes 19 and 19', trash entrained in the air stream therewith is carried radially away from the path of the cotton by the air expanding from the confinement of the intake pipes and is carried along the deflector into the evacuated interior of the tank. As the air continues through the tank towards the outlet aperture 11, a substantial part of it tends to follow the inner surface of the cylindrical wall 2, and in passing thereto from the intake pipes 19 and 19', it carries the lighter trash to the inner surface of the cylindrical wall 2. However, as the air loses velocity in its progress towards the outlet aperture 11, the trash is decelerated and disentrained from the air both by the action of gravity and by friction against the cylindrical wall. As the trash is disentrained, it slides down along the inner surface of the cylindrical wall 2, passes through the longitudinal slots 9, and continues along the inner surface of the cylindrical wall to collect below the slope sheets 7 and 7' and the belt conveyor 5 at the lowermost section of the tank.

Cotton which is projected from the end of the deflector plate is collected on the upper surface of the belt conveyor 5 and on the slope sheets 7 and 7', first filling the area adjacent the rear end wall 4, and gradually forming a mass extending from the rear end wall 4 to the region just below the rearward edge of the deflector plate 24. Since the area beneath the deflector plate 24 is shielded from the direct deposition of cotton, the belt conveyor 5 may be operated periodically by its drive mechanism 38 to carry cotton on its upper surface toward the front end wall 3, thereby accomplishing an effective distribution, compacting and overall degree of loading of the cotton. Material which is removed forwardly to fill the area beneath the deflector plate 24 is subsequently replaced by further cotton introduced into the tank until it is filled.

When the tank has become filled and it is desired to unload it, the door 27 is opened so that the cotton in the tank 2 may pass through the aperture 26 into the ejector housing. The blower 15 is now used for discharging the cotton passing from the tank 2 into the ejector 28. The compressed air discharged from the blower 15 through the conduit 32 to the jet pipe 31 entrains the cotton which initially falls through the unloading aperture 26 into the ejector housing, and carries it through the discharge pipe 29 to a collecting truck or other container. As the cotton immediately adjacent the rear end wall 4 is unloaded, the belt conveyor 5 is operated by means of the ratchet drive 38 to convey the mass of cotton in the tank along its upper surface to the unloading aperture 26. As the upper surface of the belt conveyor travels toward the unloading aperture 26 and around its pulley 37', trash particles contained therein will sift down through the cotton and deposit on the conveyor, in the depressions between its ribs, especially as the cotton immediately thereabove tumbles therefrom toward the ejector. Such trash is retained between the transverse ribs 6 as they pass around the pulley 37', and upon inversion at the lower segment of the pulley, falls to the lower segment of the cylindrical wall 2 to join the trash deposited thereon through the longitudinal slots 9. If sufficient trash is present to build up on the lower segment of the cylindrical wall and to close the distance between that surface and the lower course of the belt conveyor, in the region adjacent the pulley 37', the transverse ribs 6 of the belt will drag the excess trash away from the rear of the tank and longitudinally in the direction of the front end wall 3, thereby forming space beneath the rear end of the belt conveyor which permits the continued transference of trash from immediately beneath the cotton and around the pulley 37' to the region below the belt conveyor.

Upon completion of the cotton unloading, valve 36 in branch conduit 35 is opened and valve 33 in the conduit 32 leading to the ejector is closed so that compressed air from the blower 15 is directed through branch conduit 35 to blow trash accumulated on the lower segment of the tank wall therealong towards the trash outlet 34 for discharge from the tank.

As shown in FIGS. 5, 6 and 7, a modified embodiment of the invention comprises a tank 1a having a series of accessories and provisions which are similar to those shown and described with respect to FIGS. 1, 2, 3 and 4 and which are identified by the same numerals, suffixed "a", as were used for their counterparts in FIGS. 1, 2, 3 and 4.

In the modification, the intake pipes 19a and 19'a enter the tank 1a through individual inlet apertures 17a in the front end wall 3a. A deflector plate 24a is arranged below and adjacent the ends of the intake pipes 19a and 19'a, and is supported by side walls 25a and 25'a in a substantially horizontal position.

A partially cylindrical perforate interior wall 41 is arranged in the tank on a series of hoops 42, and is spaced thereby from the cylindrical wall 2a to form a passageway 43 along the cylindrical wall. The perforate interior wall is secured at its lower edges to the upper edges of the slope sheets 7a and 7'a, so that the passageway 43 is contiguous with the slots 9a, and communicates therethrough with the space below the slope sheets and the belt conveyor 5a. The perforate interior wall is cut way to provide a space for receiving the deflector plate 24a and side walls 25a and 25' which are sealed along the side walls. A pair of closing walls 39, 39' depend from the cylindrical wall and close the space between the perforate interior wall and the cylindrical wall where the interior wall has been cut away to receive the deflector plate 24a.

The interior wall 41 is provided with a plurality of elongated arcuate openings 44 therein, with the long dimension of the openings being several times the magnitude of their smaller dimension. However, it is to be understood that many designs and sizes of opening may be employed.

The operation of the apparatus of FIGS. 5, 6 and 7 generally is similar to the operation of the apparatus of FIGS. 1 through 4. The cotton entering the tank 2a from the ends of the intake pipes 19a and 19'a is projected onto the surface of the deflector plate 24a almost immediately, and is deflected thereby to the rear of the tank at end wall 4a. The relatively straight path of cotton flow from the intake pipe and along the deflector plate provides a very small angle of incidence of cotton against the deflector plate and, consequently, lessens opportunity for breakage of cottonseeds and subsequent degrading of the cotton by oil liberated from broken seeds.

Trash which is present in the air stream is carried to the surface of the interior wall along with the air, and passes through the openings 44 with the air to enter the passageway 43 along the surface of the cylindrical wall, and slides downwardly through the slots 9a to the space beneath the slope sheets and belt conveyor. The elongate form of the openings 44 permits the penetration of small pieces of trash, but prevents the passage of the generally rotund cotton bolls. In the case of a relatively large elongated piece of trash, such as a leaf or a piece of stem, the elongate form of the openings will permit the piece to enter the passageway edgewise, obliquely, or lengthwise, whichever way the piece may approach the opening.

Upon entering the passageway 43, the air and trash are interrupted in any prolonged, directly longitudinal motion by the hoops. The air which tends to pass along the surface of the cylindrical wall is directed peripherally of the cylindrical wall by the hoops and is caused to take a generally helical path through the spaces between the respective spacing hoops 42 and beneath the slope sheets 7' and 7'a and the belt conveyor 5a in passing from the front region of the tank to the rear region thereof. By causing that portion of the air to take such a generally helical path, a longer period is provided for the separation of the trash from the cotton.

The unloading of the apparatus of FIGS. 5, 6 and 7 is similar to that described with reference to FIGS. 1, 2, 3 and 4.

Deflectors of the type shown in FIGS. 1 to 7 are particularly advantageous when the length of the tank exceeds the normal horizontal component of the cotton trajectory. In such tanks, the cotton may fall short of the respective rear end walls 4 and 4a. However, the directing influence of the deflectors at least minimizes the short filling of the tank, and may be designed to cause the cotton to impinge lightly against the far end wall, thereby completely filling that end of the tank, without problematical breakage of the cottonseed. Furthermore, it is contemplated that the deflectors may be made adjustable, with respect to their relationship or angle with the horizontal and their spacing from the far end wall toward which the cotton is to be delivered.

The apparatus of FIGS. 5, 6 and 7 is particularly advantageous for use in cases wherein the cotton to be harvested is small in boll size and/or which breaks up into units of relatively low orders of mass or, for any other reason, tends to fall or be carried through openings such as the slots 9 of FIG. 1. The slots 9a of FIG. 5 preferably are larger, in their smaller dimension, than openings which might be used for general screening or separating of the trash from the cotton, and may be substantially larger than the slots of FIGS. 1, 2 and 3. The size of the slots is governed by the quantity of air required to flow through these slots and beneath the slope sheets and belt conveyor to preserve the tendency of the air to flow in a generally helical path along the cylindrical wall. An adequate sizing of the slots to cause the air to flow in such a helical path longitudinally along the cylindrical wall is particulary important after the tank is partially loaded and any direct passage of air to the air outlet through the center of the tank is impeded by the cotton mass.

The openings 44 of the perforate inner wall may be, for example, ⅜" or ½" in their smaller dimensions, and may take any form, such as a circle or square, but preferably are elongated in the direction following the circumference of the cylindrical wall. The provision of elongated openings facilitates the continuity of the helical travel of the air along the cylindrical wall, as well as the separation of trash from the air. Such openings also provide a greater open area in the interior wall without loss of cotton therethrough along with the air and trash.

As shown in FIGS. 8, 9 and 10, the tank 46 comprising a cylindrical wall 47 and a pair of end walls 48 and 49 is provided with a perforate, substantially cylindrical, interior wall 51, which is supported in spaced relationship with the outer cylindrical wall 47, by a plurality of hoops 52. At the lower region of the tank, the perforate interior wall is angled downwardly and inwardly on each side in a converging path, and adjacent the lower segment of the cylindrical wall 47, meets the lateral edges of a hand-operated, ribbed, endless belt conveyor 53 extending longitudinally within the tank between pulleys 73 and 73'. The tank is provided with an air exhaust aperture 54 adjacent the rear end wall 49, which end wall also is provided with an unloading aperture 55 aligned with and extending to a position slightly below the end of the upper flight of the belt conveyor, and with a hinged door 56. The end wall 49 also carries an ejector 57 serving a discharge pipe 72 and arranged immediately below and adjacent the unloading aperture 55. A blower 58 driven by a motor (not shown) is connected by means of a conduit 59 extending from its intake to an air filter 60 and to an air exhaust aperture 54. The discharge of the blower 58 is connected with a jet pipe 61 of the ejector by means of a conduit 62 having a valve 63 therein. A branch line 64 from the conduit 62 enters the tank 46 through the lower segment of the cylindrical wall and turns within the tank so that its terminal axis lies longitudinally of the tank and in alignment with the lower segment of the cylindrical wall. The conduit 62 is provided with an external valve 65. Adjacent the end wall 48, the lower segment of the cylindrical wall is provided with a trash cleanout port 66, which is closed by a suitable cover 67.

The front end wall 48 carries a plurality of intake pipes 68 which protrude through a plurality of individual apertures 69 in the perforate interior wall, and terminate inside the interior wall.

The rear end 70 of the perforate interior wall adjacent rear end wall 49 is provided with an unloading aperture 71 which is aligned with the unloading aperture 55 in the end wall 48.

In operation of the apparatus of FIGS. 8 through 10, the motor drives the blower 58 to exhaust air from the tank through the conduit 59. Evacuation of the tank causes an influx of atmospheric air through the intake pipes, and to the air outlet aperture. Cotton picked up by the nozzles and introduced into the air stream of the intake pipes 68 is projected from the ends thereof and describes a trajectory having a sufficiently large longitudinal component to carry the cotton to the far end of the tank adjacent the rear end wall 48. Trash which is present in the air stream with the cotton tends to be carried by the lateral expansion of the air through the openings of the interior wall into the space between the interior wall and the cylindrical wall and to be separated from the air as described with respect to FIGS. 5, 6 and 7. However, large pieces of trash or pieces of trash which are unusually heavy may tend to resist the lateral motion of the air and to follow a path or trajectory more closely approaching that of the cotton. However, such pieces of large or excessively heavy trash will fall short of the trajectory of the cotton and, if their path intersects the angular portion of the perforate interior wall, will pass therethrough and will fall to the inner surface of the cylindrical wall for collection on the lower segment thereof. Particles of trash which do not fall on the angular section of the interior wall will fall short of the cotton onto the ribbed surface of the belt, and will fall into the depressions between adjacent ribs, either directly or during distribution of the cotton within the tank by operation of the belt conveyor. As the volume of the interior wall is filled with cotton, such excessively large or heavy particles, which may fall on the face of the previously loaded mass of cotton, will be subjected, upon unloading of the cotton mass, to the cleaning action of the ribbed belt as it passes about the pulley 73', carrying trash around the pulley to drop onto the bottom of the cylindrical wall.

As was described with reference to FIGS. 5, 6 and 7, the spacing hoops 52 have a downwardly directing effect upon the particles of trash carried through the perforate interior wall. They also augment the spiralling tendency of the air flow about the cylindrical wall of the tank. Ideally, air passing downwardly between a pair of hoops to the area below an angular section of the interior wall and below the belt conveyor will progress slightly longitudinally therebeneath, and will continue in a circumferential direction in the next space defined by an adjacent hoop. Therefore, although the gradual increase in the mass of cotton present within the tank tends to modify the air flow occurring within the vessel as the loading of the cotton progresses, the presence of the annular space between the perforate interior wall and the inner surface of the cylindrical wall, and particularly the provision of the circumferential hoops, causes the air to follow substantially the preferred helical path.

In unloading of the apparatus of FIGS. 7 through 10, the unloading aperture door 56 is opened, the blower 58 is started, and the valves 63 and 65 are opened and closed, respectively, thereby establishing an air flow through the jet pipe 61, ejector 57 and discharge pipe 72. The cotton immediately adjacent the unloading aperture 55 will fall therethrough into the ejector housing 57 and will be conveyed therefrom through the discharge pipe 72 to a transfer truck or other receptacle. As the cotton adjacent the end wall 48 is unloaded, the belt conveyor 53 is operated to deliver the cotton mass rearwardly thereto, as previously described in connection with the other forms of the invention.

Similarly, as described with respect to FIGS. 1 through 4, trash entrapped within the cotton will fall through the cotton and is retained between the ribs of the belt conveyor 53 until the belt surface is inverted in passage around the pulley 73', whereupon the trash will fall to the lower segment of the cylindrical wall.

Upon completion of the cotton unloading, the valves 63 and 65 are thrown to divert the compressed air through the branch pipe 64 to sweep beneath the belt conveyor and along the lower segment of the cylindrical wall to blow the collected trash to the clean-out port 66.

Various changes may be made in the details of construction without departing from the spirit of the invention or sacrificing any of the advantages thereof.

I claim:

1. A harvester or the like comprising a vessel to receive the material to be harvested, said vessel having an air-material inlet, an air outlet and a material outlet, said material outlet being located in a lower portion of the vessel, a conduit through which the material to be harvested is adapted to be introduced into the vessel through the air-material inlet, said conduit being connected to the air-material inlet, means for causing a flow of air through said conduit into the vessel and through said air outlet, a conveyor in the lower portion of the vessel for conveying material in the vessel toward said material outlet, and an inclined wall extending upwardly from adjacent an edge of the conveyor to adjacent the wall of the vessel, the upper edge of said inclined wall being spaced from the vessel wall to provide a space through which foreign material introduced into the vessel along with the material being harvested may pass.

2. A harvester or the like as set forth in claim 1 in which said conveyor is an endless belt and one end of the conveyor terminates adjacent said material outlet.

3. A harvester or the like as set forth in claim 1 in which the conveyor extends along an intermediate portion of the bottom of the vessel and an inclined wall extends upwardly from each side of the conveyor to the adjacent wall of the vessel, and the upper edge of each inclined wall is spaced from the wall of the vessel to provide spaces through which foreign material introduced into the vessel along with the material being harvested may pass.

4. A harvester or the like as set forth in claim 3 in which the conduit connected to the gas-inlet forms a manifold, and a plurality of airlines terminating in collection nozzles are connected to said manifold.

5. A harvester or the like as set forth in claim 3 in which said inclined walls are imperforate.

6. A harvester or the like as set forth in claim 3 in which said inclined walls are perforated.

7. A harvester or the like as set forth in claim 3 in which the conveyor is an endless belt, the lower course of the belt is spaced from the bottom of the vessel, the space beneath the inclined walls communicates with the space beneath the endless belt, and the vessel has an outlet for foreign material in the lower portion thereof.

8. A harvester or the like as set forth in claim 7 including a housing positioned to receive material discharged from the vessel through said material outlet, and ejector means for ejecting material passing into said housing.

9. A harvester or the like as set forth in claim 7 in which the outlet for foreign material is adjacent one end of the vessel, and means are provided for the introduction of air under pressure into the lower portion of the vessel at the opposite end in a direction to move foreign material along the bottom of the vessel and to discharge it through said foreign-material outlet.

10. A harvester or the like as set forth in claim 9 in which both the outlet for foreign material and the means for introducing the air under pressure to discharge foreign material are beneath said endless belt, and the means for introducing the air under pressure is a blow-out pipe extending along a portion of the bottom of the vessel.

11. A harvester or the like as set forth in claim 1 in which the vessel is elongated, the air-material inlet is located adjacent one end, the air outlet is located adjacent the opposite end, and the vessel is provided with means for directing air and material introduced through said air-material inlet lengthwise of the vessel towards the opposite end.

12. A harvester or the like as set forth in claim 1 including a blower having the intake thereof connected to the air outlet, a housing positioned to receive material discharged from the vessel through said material outlet, air ejector means for ejecting material passing into said housing, said ejector means including an air nozzle and an air-material discharge pipe, the entrance to said discharge pipe being spaced from the air nozzle and the space between the air nozzle and the entrance to the discharge pipe being in free communication with the space in said housing, so that the material in said housing may pass into said space to be entrained by a blast of air from said nozzle, and a conduit connecting the discharge side of said blower with said air nozzle.

13. A harvester or the like as set forth in claim 12 in which the conveyor is spaced from the bottom of the vessel, the space beneath said inclined wall is in communication with the space beneath said conveyor, the vessel has a discharge for foreign material in the lower portion thereof, the space above said foreign material discharge is in free communication with the space beneath said conveyor, a branch pipe leads from the conduit connecting the blower to the air nozzle to the lower portion of the vessel, and the outlet of said branch pipe is positioned to direct a blast of air therefrom along the bottom of the vessel towards said foreign material discharge opening.

14. A harvester or the like comprising a vessel to receive the material to be harvested, said vessel having an air-material inlet, an air outlet and a material outlet, a conduit connected to said air-material inlet through which the material to be harvested is adapted to be introduced into the vessel, means for causing a flow of air through said conduit into the vessel and through said air outlet, a conveyor in the lower portion of the vessel for conveying material in the vessel toward said material outlet, an inclined wall extending upwardly from adjacent an edge of the conveyor to adjacent the wall of the vessel, the upper edge of said inclined wall being spaced from the vessel wall to provide a space through which foreign material introduced into the vessel along with the material being harvested may pass, a perforated interior wall above the upper edge of said inclined wall and spaced from the wall of the vessel, the wall of the vessel and said interior wall forming a space between them communicating with the space between the upper edge of the inclined wall and the wall of the vessel.

15. A harvester or the like as set forth in claim 14 in which the conveyor extends along an intermediate portion of the bottom of the vessel and an inclined wall extends upwardly from each side of the conveyor to the adjacent wall of the vessel, the upper edge of each inclined wall is spaced from the wall of the vessel to provide spaces through which foreign material introduced into the vessel along with the material being harvested may pass, and a perforated interior wall extends above the upper edge of each inclined wall and each interior wall is spaced from the wall of the vessel and the space between the respective interior walls and the walls of the vessel communicate with the respective spaces between the upper edges of the inclined wall and the wall of the vessel.

16. A harvester or the like as set forth in claim 14 in which the conveyor is an endless belt, the lower course of the belt is spaced from the bottom of the vessel the space beneath the inclined wall communicates with the space beneath the endless belt, and the vessel has an outlet for foreign material in the lower portion thereof.

17. A harvester or the like as set forth in claim 14 in which the conveyor extends along an intermediate portion of the bottom of the vessel and an inclined wall extends upwardly from each side of the conveyor to the adjacent wall of the vessel, the upper edge of each inclined wall is spaced from the wall of the vessel to provide spaces through which foreign material introduced into the vessel along with the material being harvested may pass, and the perforate interior wall extends from the upper edge of one inclined wall around the top of the vessel to the upper edge of the other inclined wall.

18. A harvester or the like as set forth in claim 17 in which the conveyor is an endless belt, the lower course of the belt is spaced from the bottom of the vessel, the space beneath the inclined wall communicates with the space beneath the endless belt, the vessel is elongated, the air-material inlet is adjacent one end of the vessel, the air outlet is adjacent the opposite end of the vessel, the space between the perforate interior wall and the wall of the vessel is divided into compartments lengthwise of the vessel and the respective compartments are in free communication with the space beneath the inclined walls and the endless belt, whereby air introduced into the vessel through the air-material inlet and passing through the perforate interior wall into said compartments will be caused to take generally a helical course along the interior wall of the vessel towards said air outlet.

19. A harvester as set forth in claim 17 in which said inclined walls are imperforate.

20. A harvester or the like as set forth in claim 17 in which said inclined walls are perforated.

21. A harvester or the like as set forth in claim 17 in which a perforate interior wall is positioned adjacent, but spaced from the walls of the vessel opposite the ends of the conveyor.

22. A harvester or the like as set forth in claim 21 in which the air material inlet is a conduit extending inwardly through one of the walls of the vessel opposite an end of the conveyor and into the space defined by said perforate interior walls.

References Cited in the file of this patent

UNITED STATES PATENTS

| | | |
|---|---|---|
| 329,498 | Spitzer | Nov. 3, 1885 |
| 1,660,682 | Stebbins | Feb. 28, 1928 |
| 1,695,383 | McCarthy | Dec. 18, 1928 |
| 1,833,346 | Ziegler | Nov. 24, 1931 |
| 2,210,103 | Stoner | Aug. 6, 1940 |
| 2,255,206 | Duncan | Sept. 9, 1941 |
| 2,499,693 | Stanton | Mar. 7, 1950 |
| 2,646,593 | Downey | July 28, 1953 |

FOREIGN PATENTS

| | | |
|---|---|---|
| 324,469 | Great Britain | Jan. 30, 1930 |
| 346,481 | Great Britain | Apr. 16, 1931 |